United States Patent [19]

Catano et al.

[11] 4,153,917
[45] May 8, 1979

[54] IMAGE STABILIZER SYSTEM FOR STOP-ACTION PLAYBACK

[75] Inventors: Paul S. Catano, San Diego; Michael A. Monahan, Poway; Keith Bromley, San Diego, all of Calif.

[73] Assignee: The United States of America as represented by the Secretary of the Navy, Washington, D.C.

[21] Appl. No.: 871,313

[22] Filed: Jan. 23, 1978

[51] Int. Cl.² .................... H04N 3/08; H04N 5/78
[52] U.S. Cl. ................................. 360/10; 358/87; 360/37
[58] Field of Search ............... 360/9, 10, 11, 36, 37; 358/8, 87, 93

[56] References Cited

U.S. PATENT DOCUMENTS

| | | | |
|---|---|---|---|
| 3,758,710 | 9/1973 | Crosno | 360/36 |
| 3,758,711 | 9/1973 | Crosno | 360/36 |
| 3,777,054 | 12/1973 | Loughry | 360/36 |
| 3,886,589 | 5/1975 | Nasu | 360/11 |
| 3,888,385 | 6/1975 | Loughry | 360/36 |
| 3,959,582 | 5/1976 | Law et al. | 358/87 |
| 4,027,333 | 5/1977 | Kaiser et al. | 360/11 X |
| 4,058,840 | 11/1977 | Kasprzak | 360/10 |

*Primary Examiner*—Bernard Konick
*Assistant Examiner*—Donald McElheny

*Attorney, Agent, or Firm*—R. S. Sciascia; G. J. Rubens; J. W. McLaren

[57] ABSTRACT

Light energy data is generated in sequential interlaced field raster format by a sensor driven in azimuth to detect a panoramic scene. The light energy data is sequentially recorded together with an azimuth rate signal which is a function of the rate that the sensor is driven in azimuth. Because the sensor has been driven in azimuth, however, there is a delay in the sequential detection between first and second interlaced fields of any selected frame of the panoramic scene; consequently, when it is desired to retrieve and playback a "stop-action" image comprised of a selected frame, compensation must be made for the delay. The recorded azimuth rate signal is used to develop a commensurate delay between the two sequential first and second interlaced fields of light energy data comprising the selected frame of light energy data which is desired to playback in "stop-action" form. The delay period thus developed is applied to correct the delay between the first and second interlaced fields so that visual display means, such as cathode ray tube monitor, may display the "stop-action" playback of the selected frame in a corrected form, eliminating the "jitter" that otherwise would be visually present between first and second interlaced fields due to the sequential field rate of the raster format in which the light energy data is recorded relative to the azimuthal rate at which the sensor was driven.

8 Claims, 6 Drawing Figures

IMAGE STABILIZER SYSTEM FOR STOP-ACTION PLAYBACK

BACKGROUND OF THE INVENTION

When a television camera, or an analogous sensor, employing sequential interlaced field raster format is driven in azimuth to detect the light energy representative of a panoramic scene, the sensing of sequential interlaced fields representing any single selected frame is delayed relative to each other because of the azimuthal movement necessary to provide the panoramic scene.

Frequently, such panoramic detected scenes are desired to be recorded for further analysis at a later time.

For example, an underwater vessel, such as a submarine may use an imaging sensor extended above the surface of the sea to provide a panoramic above-water scene, recording the sensed light energy data representative of the panoramic scene, and then retracting the sensor to an underwater position.

The light energy data representative of the panoramic scene (as generated in sequential interlaced field raster format) is recorded and stored in its sequential order. For purposes of analysis of any selected portion of the recorded light energy data, a selected recorded frame of such data may be retrieved and played back on a compatible visual display means, such as a television type monitor, for example.

However, a problem arises in the visual presentation of a selected frame of the recorded light energy data representative of a portion of the panoramic scene because of the delay between the sensing of the two interlaced fields comprising any selected frame of such data, due to the fact that the sensor was panoramically driven in azimuth during the period when the scene was detected.

Thus, if the two sequential interlaced fields comprising a selected frame are retrieved from a recording means, such as a magnetically recording disc, for example, and impressed upon visual display means such as a television type monitor, without modification, the visual result will be the selected frame comprised of two fields which appear to be out of synchronism and present an appearance of "jitter" because one interlaced field is displaced horizontally relative to the other. The "jitter" is caused by the delay introduced between the sensing and recording of the two interlaced fields due to the sensor being panoramically driven in azimuth during the time of such sensing and recording.

In the present state of the art there are "stop-action" recording devices in systems presently available which attempt to circumvent the "jitter" problem by disregarding either the first or the second field of a selected frame of light energy data to provide a playback frame of visual display comprised entirely of either the first or the second field interlaced with itself. This expedient, in effect, discards one of the two interlaced fields so as to eliminate the time delay between the two interlaced fields of the selected frame of visual information. Although this technique solves the "jitter" problems, those skilled and knowledgeable in the pertinent arts will readily appreciate that in discarding one of the two interlaced fields, one half of the resolution of the visual presentation is also discarded. Since the purpose of the playback of recorded informaton of this kind is generally to achieve greater depth of analysis of visual information which may be present in a selected frame of a panoramic scene, it is obvious that discarding one half the resolution through the technique of interlacing a single frame with itself has the effect of commensurately downgrading the results of such analysis.

Accordingly, it is highly desirable that a "stop-action" playback system be devised for displaying a selected image from light energy data representative of a panoramic scene generated in sequential interlaced field raster format by a sensor driven in azimuth, which will eliminate the "jitter" otherwise encountered and yet retain maximum resolution of information contained in the light energy data.

SUMMARY OF THE INVENTION

The present invention contemplates an improved "stop-action" playback system for displaying a selected image from light energy data representative of a panoramic scene generated in sequential interlaced field raster format by a sensor driven in azimuth during the recording of such light energy data. The selected image will usually comprise a frame of visual data made up of first and second fields in the interlaced field raster format. A recording device such as a magnetic recording disc, for example, provides a means for receiving and sequentially storing the light energy data, as well as providing the means for retrieving any selected frame of such recorded data comprised of two sequential interlaced fields.

A means such as a tachometer driven synchronously with the sensor develops an aximuth rate signal as a function of the rate at which the sensor is driven in azimuth to develop the light energy data representative of the entire panoramic scene. The azimuth rate signal is recorded in synchronism with the recorded light energy data which may be conveniently accomplished by recording the azimuth rate signal on the same magnetic recording disc as the light energy data.

Means, such as the retrieval portion of a magnetic recording disc system, is provided for sensing and retrieving a selected frame comprised of sequential first and second interlaced fields of the stored light energy data. However, such first and second sequential interlaced fields, which make up any selected frame of light energy data, will have a delay therebetween due to the azimuthal rate at which the sensor was driven relative to the sequential field rate at which the raster format of the selected frame was recorded. Such delay must be corrected in order to avoid the "jitter" between the two interlaced fields which will otherwise appear when visually presented in the "stop-action" playback form, such as by a television type monitor, for example.

Accordingly, the present invention contemplates a means for developing a time signal as a function of the rate at which the sensor was driven in azimuth at the time the light energy data was sensed and recorded. Such time signal is developed from the recorded azimuth rate signal and is impressed as a corrective delay period between the selected first and second interlaced fields of light energy data for eliminating the delay therebetween due to the sequential field rate of the raster format relative to the azimuthal rate at which the sensor was driven.

This delay correction may be impressed between the first and second interlaced fields of each frame of light energy data before such interlaced fields are recorded or, alternatively, the corrective delay may be impressed upon sequential interlaced fields at the time they are retrieved from recording, before they are presented visually in "stop-action" playback form such as by a television type monitor, for instance.

Such choice, within the contemplation of the present invention, will depend primarily upon the conveniences offered by the particular system in which the "stop-action" playback concept is employed. For example, if the sensor comprises a television type camera it may be convenient to apply such corrective delay to first and second interlaced fields of light energy data immediately upon having been developed by the television camera and before recording. However, if the sensor is such that problems of access to its vertical and horizontal synchronizing signals may be involved, the present invention contemplates that its technique may be equally effectively applied to the visual display means such as a television type monitor, particularly if such television type monitor is provided with external vertical and horizontal synchronizing access.

The corrective delay period may be generated within the concept of the present invention in several different ways, the choice of which will also depend upon other parameters involved in the overall equipments in which the "stop-action" playback system in the present invention is employed. In one case, the concept of the present invention may be implemented by the use of a voltage controlled oscillator which develops an output signal having a frequency dependent upon the rate at which the sensor is driven in azimuth. On alternate vertical synchronizing signals, the output of the voltage controlled oscillator is caused to countdown a fixed number of counts in a down counter. The time it takes to complete such countdown therefore is a function of the delay between the two sequential interlaced fields comprising the frame of light energy data providing the selected image retrieved from the recorded data.

Alternatively, an analog-to-digital converter may be employed to receive the azimuth drive rate signal for providing a digital output commensurate with the rate of azimuth drive. The resultant digital output signal is converted to a commensurate time delay and such corrective time delay is interposed between first and second interlaced sequential fields comprising a frame for displaying a selected image in "stop-action" playback form.

Those skilled and knowledgeable in the pertinent arts will readily appreciate that the concept of the present invention and its technique for correcting "jitter" between sequential interlaced fields of a selected frame of light energy data information may be implemented by suitable means other than the two foregoing examples.

Accordingly, it is a primary object of the present invention to provide a "stop-action" playback system for eliminating the "jitter" from the visual display of a selected image derived from light energy data representative of a panoramic scene generated in sequential interlaced field raster format by a sensor driven in azimuth.

An equally important object of the present invention is to provide such a "stop-action" playback system for displaying a selected frame of light energy data comprising first and second interlaced fields without sacrificing the maximum resolution contained in such fields.

A further object of the present invention is to provide such a "stop-action" playback system which develops a time signal as a function of the rate at which the light energy sensor is driven in azimuth to develop the light energy data representative of the panoramic scene.

Another object of the present invention is to provide such a "stop-action" playback system in which such time signal may be impressed as a corrective delay between the sequential first and second interlaced fields of light energy data comprising the selected frame image, either before such light energy data is recorded, or after it is retrieved from the recording means for visual display presentation.

Yet a further object of the present invention is to provide such a "stop-action" playback system which is readily adapted to employ a predetermined corrective delay between sequential first and second interlaced fields of light energy data commensurate with predetermined rates at which the sensor developing delayed energy data is driven in azimuth for correction of the predetermined time delay between sensing of the first and second interlaced fields.

Yet another object of the present invention is to provide a "stop-action" playback system in which the corrective delay time signal may be readily developed by the employment of either analog or digital techniques.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

Figure 1:
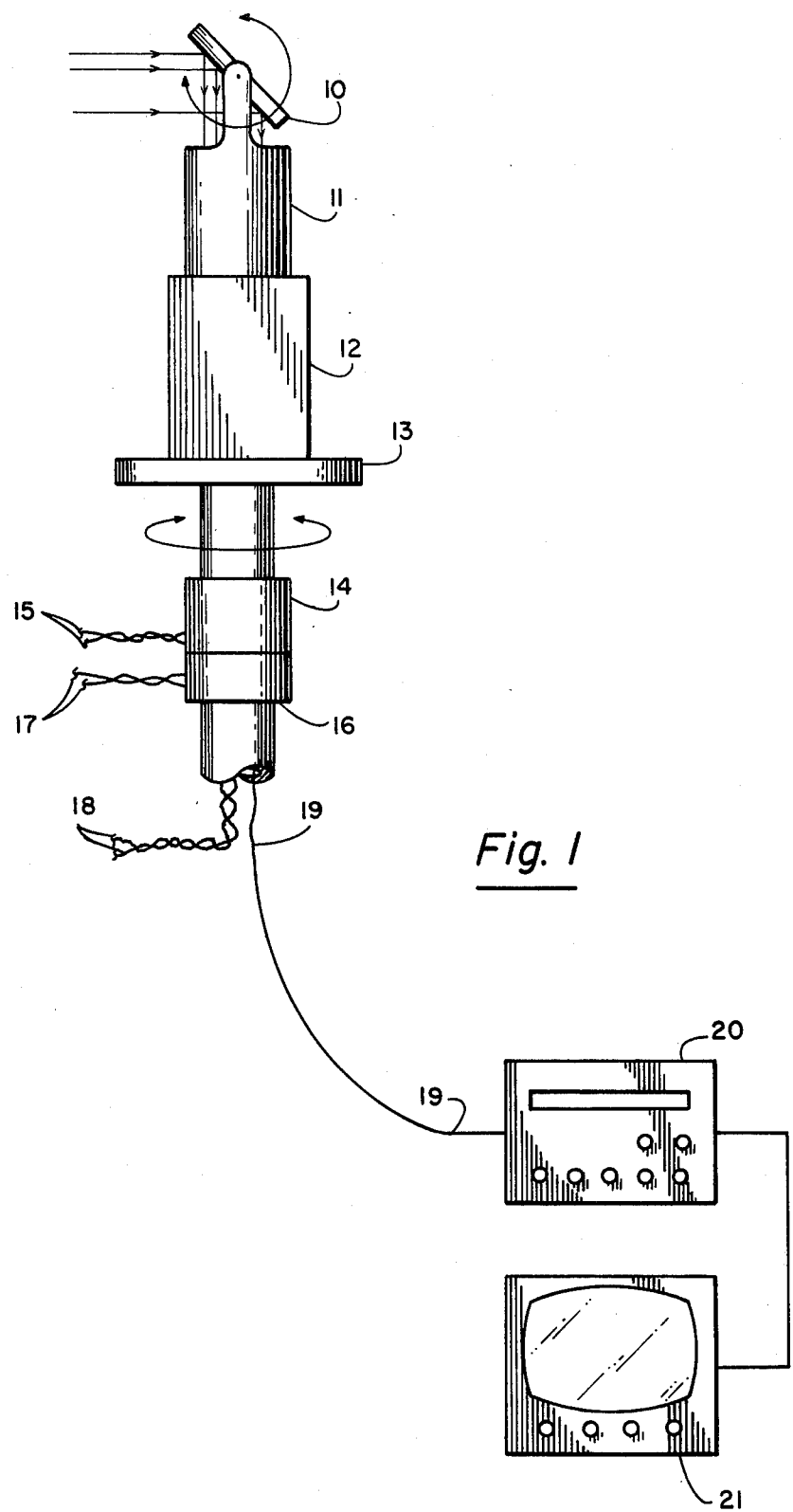
FIG. 1 is an illustration of a typical equipment used to sense light energy data representative of a panoramic scene generated in sequential interlaced field raster format.

The concept of the present invention addresses the problem which arises when an imaging device such as a television camera or an infrared thermal imaging sensor is panned in azimuth, as through a panoramic field of view, so that during a period of time in which two interlaced fields comprising a frame of the scene being imaged, the sensor has been moved in azimuth through a significant portion of the field of view. If the light energy data sensed in this manner is recorded, it may be played back at a later point in time in a "stop-action" fashion for purposes of close analysis to uncover the full measure of information which may be in the recorded scene.

State of the art recording devices such as a magnetic disc recorder, for example, enable the retrieval of a selected frame of light energy data recorded in sequential interlaced field raster format in the conventional television manner. Each frame thus recorded consists of two fields of video information. However, as is noted hereinbefore, due to the fact that the sensor was being rotated in azimuth while developing the light energy data representative of the panoramic scene, one of two interlaced fields comprising any selected frame of light energy data information is delayed with respect to its other interlaced field.

As retrieved from the recorded information, the two fields comprising any selected frame of light energy data information will be played back alternately over and over again. However, due to the delay between the sensing of one field relative to the other, each point of interest in such visual display as may be provided by a television type monitor, for example, will appear to jump back and forth at the frame rate, thus creating "jitter" and rendering indentification and recognition of visual information difficult, if not impossible.

The present invention conceives the application of a corrective delay to alternate fields which constitute the frame of light energy data it is desired to present in a "stop-action" playback of visual display. Such corrective delay may be applied to the light energy data before it is recorded, in which case it will be retrievable and already in corrected form eliminating the "jitter" from any selected frame of such information which is desired to display visually; alternatively, the corrective delay may be applied to the visual display means, such as a television type monitor, for example, which receives the light energy data retrieved from the recording means for a visual display.

The corrective delay required is a function of the rate at which the sensor is driven in azimuth relative to the horizontal line and field frequency comprising the raster format of the sensor.

The delay designated $T_d$ is some fraction of the time period of a horizontal line. For purposes of explanation it will be assumed that the light energy sensor is a standard 525 line television camera or an infrared thermal imaging system employing the same standard 525 line television raster format for purposes of rendering it compatible with remote television type monitoring.

Such line scan imaging devices have a frame rate of 30 per second and a field rate of 60 per second wherein two fields are interlaced to form one frame. Accordingly, the 525 line television raster format is comprised of two fields, each of which is composed of 262.5 lines interlaced with the next field in such a manner that adjacent lines in any frame are separated by 1/60th of a second. Therefore, the time period of one horizontal line is approximately 63.5 $\mu$ seconds. Thus, if the imaging sensor which detects the light energy data is panned in azimuth to sense a panoramic scene, a vertical line in the field of view may appear to be two broken parallel lines on the "stop-action" playback visual display depending, of course, upon the panning rate.

For example, if "v" is the panning rate in degrees per second, and "h" is the azimuth subtent of the sensors field of view in degrees, then $$\alpha = v/60h \tag{1}$$

where $\alpha$ represents the fraction of the field of view that all vertical objects undergo in 1 field time.

Knowing $\alpha$, $Y_d$ can be calculated directly from the equation $$Y_d = \alpha Y_L \tag{2}$$

where $Y_L$ is the active line time (excluding retrace) in a line-scan imager. For standard 525-line imagers $Y_L$ is approximately 57.5 usec.

Thus, for a standard television raster type system with a 12 degree field of view being panned at 36 degrees per second, $$T_d = \frac{(36)(57.5)}{(60)(12)} = 3.0 \; \mu\text{sec}. \tag{3}$$

Accordingly, alternate fields of a single selected frame of light energy data information are sensed at a delayed rate of 3.0 $\mu$ seconds.

The present invention contemplates a means by which a corrective delay of an equal amount may be applied in the example given to prevent the inter field "jitter" and stablize the image without loss of information or resolution.

FIG. 1 is a partially pictorial, partially schematic representation of a system of the type developing light energy data representative of panoramic scene generated in sequential interlaced field raster format by a sensor being driven in azimuth which is subject to the problems described hereinbefore and which may advantageously avail of the concept and teaching of the present invention.

In FIG. 1, a pointing mirror 10 is mounted and articulated in elevation on an appropriate support 11 which also provides a housing for a lens (not shown). Light energy data transmitted by reflection of the mirror 10 in a downward axial direction is received by an image sensor, such as a television camera (not shown) mounted within the housing 12.

The housing 12 is supported on a mounting disc 13 which in turn is driven by an azimuth motor 14 through the motor control connections 15. A tachometer 16 is fixedly mounted to the support structure so as to be driven by the azimuth motor 14 in the same manner as the television camera contained within the housing 12 and the pointing mirror 10 which transmits panoramic light energy data to it. The tachometer 16, accordingly, will provide an output signal through tachometer connections 17 which is a function of the rate the entire assembly is driven in azimuth.

The pointing mirror 10 may be angularly controlled through suitable pointing mirror control connections 18 so as to be angularly disposed in elevation as desired. The output of the television camera contained within the housing 12 is connected through a composite video lead connection 19 to a "stop-action" recorder 20 which may, for example, be of the video magnetic disc type, such as an Arvin Echo-Science, Model VDRI which is commercially available. The "stop-action" recorder 20 is in turn, connected to a visual display means 21 which may be a conventional television type monitor, for example.

Accordingly, light energy data representative of a panoramic scene is generated by the rotating optical and television camera assembly in sequential interlaced field raster format while the assembly is being driven in azimuth to detect the panoramic scene.

The "stop-action" recorder 20 receives and sequentially stores the light energy data thus developed. However, when it is desired to provide a "stop-action" playback visual display of a selected frame of such light energy data, the problem of "jitter" arises for reasons fully discussed and explained hereinbefore.

The same problems of "jitter" are present in a system where an infrared imager assembly replaces the television camera previously described. Such a thermal imager assembly may comprise orthogonally articulated mirrors providing horizontal and vertical scans to transmit infrared energy to a sensor in sequential interlaced field format.

Figure 2A:
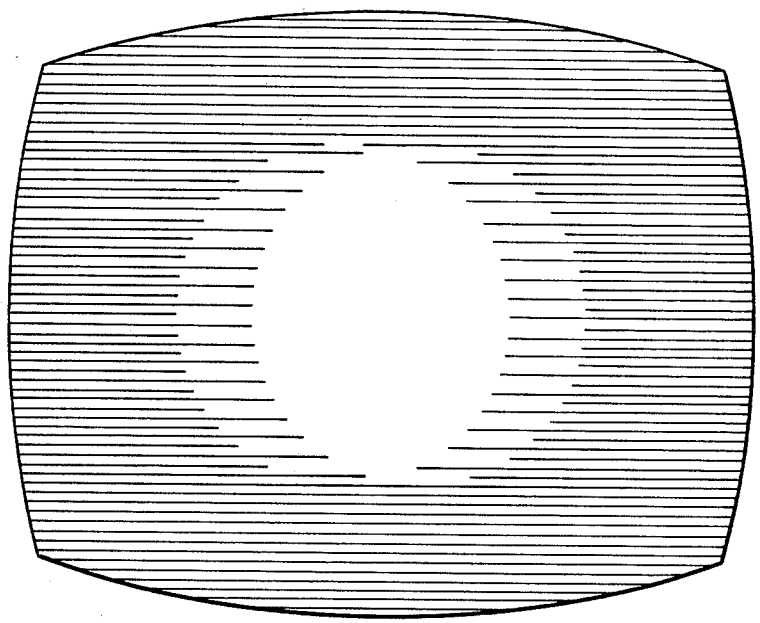
FIGS. 2A and 2B are illustrations of the visual display of light energy data in its uncorrected "stop-action" playback form and in its corrected "stop-action" playback form.
Figure 2B:
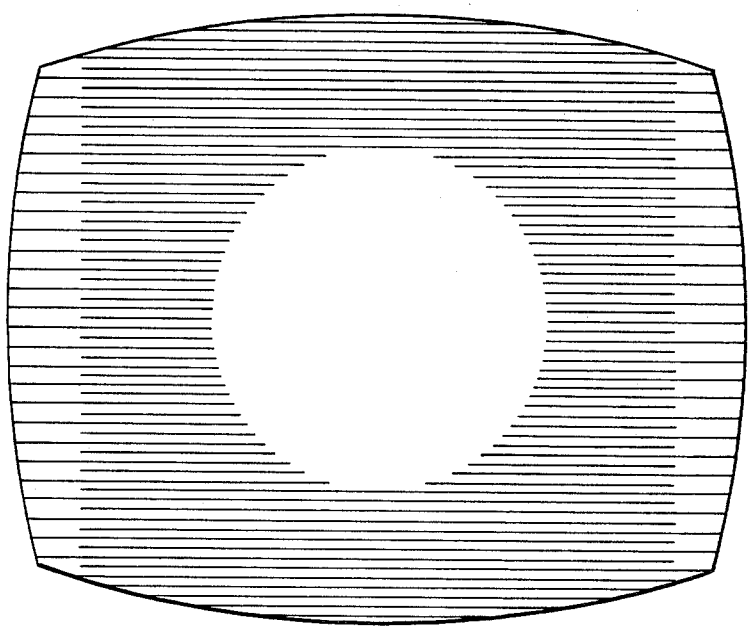

The problem of "jitter" which is caused by the rate at which the sensing assembly is driven in azimuth relative to the sensing of first and second interlaced fields of the raster format may be understood better from the illustrations in FIGS. 2A and 2B. FIG. 2A shows an interlaced field representation of a circular object detected through the optical system and the image sensor in the form of a television camera; when recorded, and played back without delay correction, the visual presentation on a means such as a conventional television type monitor will appear in a "jittered" horizontally displaced alternate field form as illustrated.

The present invention provides and develops a corrective delay impressed upon alternate fields of a selected frame to present the visual display as shown in FIG. 2B. The amount of corrective delay may be readily discerned from the displacement of the beginning and end of alternate horizontal lines in the raster format. It is to be understood that FIGS. 2A and 2B are simplified for purposes of clarification and explanation, and are not of the 525 horizontal line television format.

Figure 3:
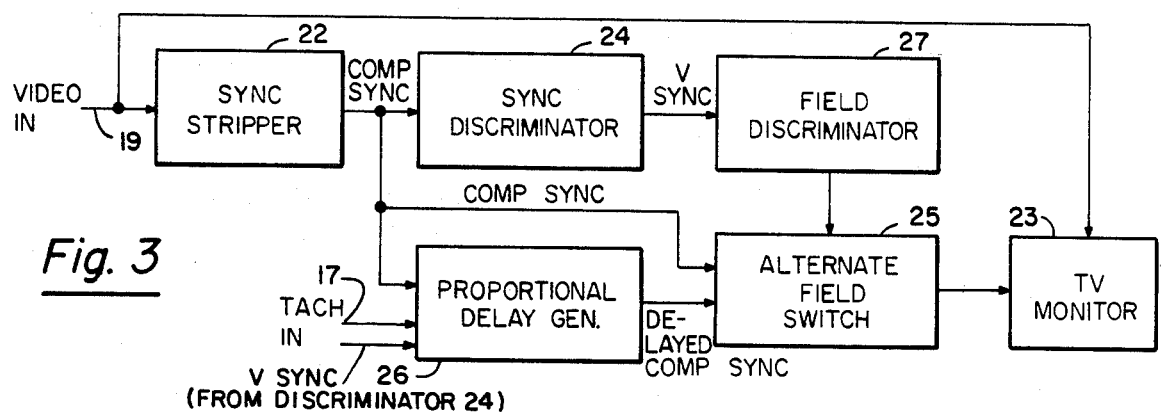
FIG. 3 is a schematic block diagram of the present invention.

FIG. 3 is a schematic block diagram of a preferred embodiment of a "stop-action" playback image stablizer system of the present invention. In FIG. 3 the video light energy data transmitted by connection 19 is received at a synch stripper 22 and also at a conventional television type monitor display means 23. The synch stripper 22 passes only the vertical and horizontal synchronizing signals, eliminating the video light energy data information. Such vertical and horizontal composite synchronizing signals are received by a synch discriminator 24, by alternate field switch 25, and by a proportional delay generator 26. The synch discriminator 24 passes only the vertical synchronizing signals which are connected into a field discriminator 27. The field discriminator 27 produces an output at the field rate to control the operation of the alternate field switch 25 at that field rate.

The output of the tachometer 16 (shown in FIG. 1) which is a function of the rate at which the sensing system is driven in azimuth is transmitted over connections 17 and connected as one of the two inputs to the proportional delay generator 26. The proportional delay generator develops a time signal which is a function of the rate the sensing assembly is driven in azimuth; that time signal is impressed as a corrective delay between first and second interlaced fields of light energy for correcting the delay between the sensing of a first and second interlaced fields due to the sequential field rate of the raster format relative to the azimuthal rate at which the sensor assembly is driven. This is accomplished by a delayed composite synchronizing signal connected as one of several inputs to the alternate field switch 25.

The alternate field switch 25 which may comprise a single pole, dual throw, field effect transistor type of switch functions in response to the output of the field discriminator 27 to alternate between undelayed horizontal and vertical composite synchronizing signals received from the synch stripper 22, and delayed composite synchronizing signals received from the proportional delay generator 26. Such alternate undelayed and delayed sunchronizing signals are impressed upon the vertical and horizontal synchronizing controls of the conventional television type monitor 23 so that alternate delay corrected fields and undelayed fields are presented as the video portion of the light energy data being displayed. Thus, a selected frame of light energy data comprised of two sequential interlaced fields is presented in stablized visual display, eliminating the "jitter" that would otherwise be introduced by reason of the rate at which the sensing assembly is driven in azimuth while the light energy data is initially sensed and detected.

Figure 4:
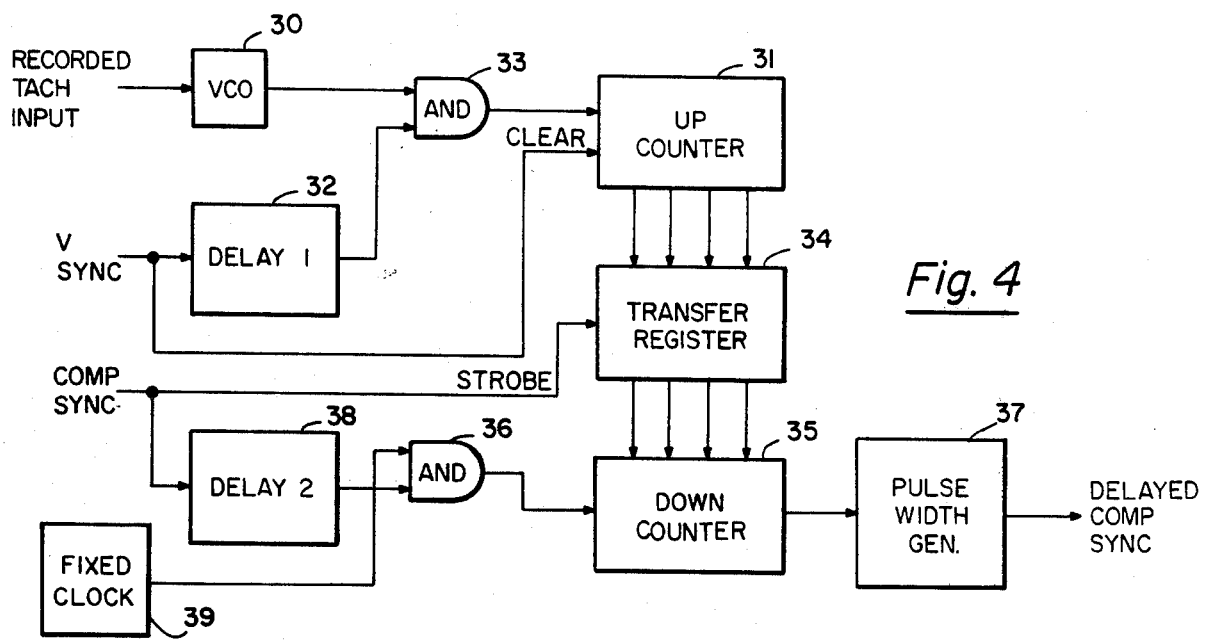
FIGS. 4 and 5 are schematic block diagrams of variant forms of the proportional delay generator as conceived and employed in the present invention.

The proportional delay generator 26 may take several variant forms as conceived and taught by the present invention. As shown in FIG. 4, the proportional delay generator may be comprised of a voltage controlled oscillator 30 which receives an input developed by the tachometer 16 of FIG. 1 as a function of the rate at which the sensing assembly is driven in azimuth. The voltage controlled oscillator 30 operates to produce an output having a frequency which is a function of the amplitude of its analog input, which, in turn, is a function of the panning speed or azimuth drive rate.

An up counter 31 is actuated at the field rate by the vertical synchronizing signal V SYNC connected as one of its inputs to clear it. When the up counter 31 has been cleared after a time delay interposed by the delay means 32, the clock type pulses produced by the voltage controlled oscillator 30 are gated through AND gate 33 to be received by up counter 31 for the duration of each vertical synchronizing pulse. Therefore, a number of pulses which is a function of a panning speed or azimuth drive rate is stored in the up counter at the start of each field.

A transfer register 34 functions to transfer the stored number from the up counter 31 to a down counter 35 each time a horizontal synchronizing pulse is to be delayed, which transfer is accomplished under the control of the composite synchronizing signals received as the second input to the transfer register 34.

The down counter, under the control of the AND gate 36 which is gated at the field rate counts down the clock pulses from the number transferred to zero at a constant frequency countdown rate. The duration of such repetitive counting is therefore a delay that is a function of the rate at which the sensor assembly is driven in azimuth. Upon the down counter 35 reaching its zero count an "end of count" output signal is transmitted to a pulse width generator 37 which produces an output synchronization pulse which is delayed as a function of the length of time the down counter was actuated in reducing its input count to zero. The output of pulse generator 37 then becomes the delayed composite synchronizing signal which is connected to the alternate field switch 25 as shown in FIG. 3.

Figure 5:
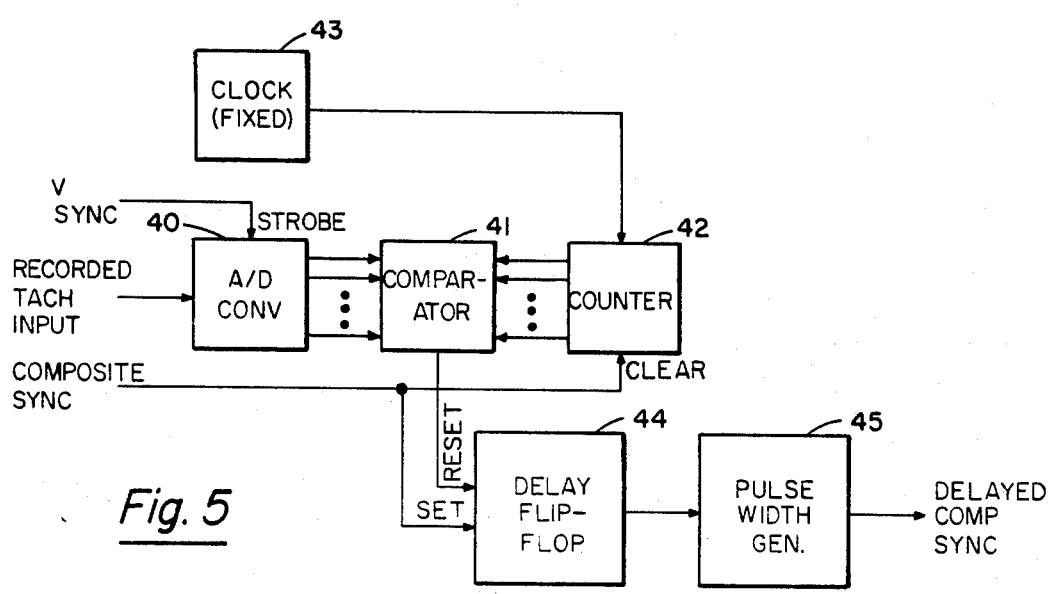

FIG. 5 shows an alternate proportional delay generator which may be employed within the concept and teaching of the present invention. In FIG. 5 the signal developed as a result of the rate the tachometer is driven in azimuth (as shown in FIG. 1) is fed as the input to A/D converter 40. At each vertical synchronizing signal V SYNC, the binary output of the A/D converter 40 is fed as an input to a comparator 41.

The output of a counter 42 is fed as the second input to the comparator 41. As shown in FIG. 5, the instantaneous count in counter 42 is determined by the clock pulses received from a fixed frequency clock 43. Therefore, the comparator 41 functions to compare the binary number in the A/D converter 40 with the instantaneous count in the counter 42.

When these two inputs to comparator 41 are equal, a "reset" pulse is developed as an output which is connected as an input to a delay flip-flop 44. The duration of the counting function of counter 42 up until the generation of a "reset" output pulse from the comparator 41 is therefore a time period or delay which is a function of the binary number in the A/D converter 40 which is developed in response to the azimuth drive rate.

The delay flip-flop 44 is "set" upon reception of each composite synchronizing pulse and "reset" at the end of each proportional delay counting. The delay flip-flop 44 therefore generates "set" and "reset" signals which are a function of the corrective delay required to eliminate "jitter" in a playback "stop-action" visual presentation. Its output is fed to a pulse width generator 45, the operation of which is comparable to that previously described in connection with the embodiment of FIG. 4 and a corrective delay composite synchronizing signal is developed as its output in the manner analogous previously described in connection with the pulse width generator operation described in connection with the embodiment of FIG. 4.

Those skilled and knowledgeable in the pertinent arts will appreciate that the concept of the present invention may be implemented by proportional delay techniques other than those specifically disclosed.

Moreover, where a sensing assembly is driven in azimuth at one or more pre-set and predetermined constant rates, pre-set and predetermined corrective delays may be applied within the teaching of the present invention to eliminate "jitter". Such pre-set corrective delay may, for example, be readily developed by appropriate inductive-capacitive or resistive-capacitive delay circuits.

Obviously many other modifications and variations of the present invention are possible in the light of the above teachings. It is therefore to be understood that within the scope of the appended claims the invention may be practiced otherwise than as specifically described.

What is claimed is:

1. A "stop-action" playback system for displaying a selected image from light energy data representative of a panoramic scene generated in sequential interlaced field raster format by a sensor being driven in azimuth comprising:
   means for developing an azimuth rate signal as a function of the rate said sensor is driven in azimuth;
   recording means for receiving and sequentially storing said light energy data and said azimuth rate signal in synchronism with said light energy data;
   means receiving said azimuth rate signal for developing a time signal as a function of the rate said sensor is driven in azimuth;
   means impressing said time signal as a delay between said sequential first and second interlaced fields of light energy data for correcting the delay between the sensing of said first and second interlaced fields due to the sequential field rate of said raster formate relative to the azimuthal rate at which said sensor is driven; and
   means for visually displaying "stop-action" playback of said selected frame comprised of said first and second fields interlaced in time delay corrected form.

2. A "stop-action" playback system as claimed in claim 1 wherein said time signal is impressed as a delay to the sequential interlaced field raster format at said sensor.

3. A "stop-action" playback system as claimed in claim 1 wherein said time signal is impressed as a delay to the means for visually displaying "stop-action" playback of said selected frame comprised of said first and second fields.

4. A "stop-action" playback system as claimed in claim 1 wherein said means for storing said light energy data comprises a magnetic disc recorder.

5. A "stop-action" playback system as claimed in claim 1 wherein said means for developing an azimuth rate signal as a function of the rate said sensor is driven in azimuth includes a tachometer driven with said sensor.

6. A "stop-action" playback system as claimed in claim 1 wherein said means receiving said azimuth rate signal for developing a time signal as a function of the rates said sensor is driven in azimuth includes a voltage controlled oscillator for generating output signals having a frequency commensurate with its voltage input.

7. A "stop-action" playback system as claimed in claim 6 wherein said means receiving said azimuth rate signal for developing a time signal includes a counter for receiving said output signals.

8. A "stop-action" playback system as claimed in claim 7 wherein said means receiving said azimuth rate signal for developing a time signal includes a down counter connected to receive the output of said counter upon actuation in response to a synchronization signal derived from a synchronization signal of said sequential interlaced field raster format.

* * * * *